United States Patent
Kim (10) Patent No.: US 10,978,952 B2
(45) Date of Patent: Apr. 13, 2021

(54) LOW-VOLTAGE DC-DC CONVERTER INCLUDING ZERO VOLTAGE SWITCHING AND METHOD OF DRIVING SAME

(71) Applicant: Hyundai Mobis Co., Ltd., Seoul (KR)

(72) Inventor: Won Gon Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/513,195

(22) Filed: Jul. 16, 2019

(65) Prior Publication Data

US 2020/0028438 A1    Jan. 23, 2020

(30) Foreign Application Priority Data

Jul. 18, 2018   (KR) .......................... 10-2018-0083575

(51) Int. Cl.
*H02M 3/24*    (2006.01)
*H01F 27/24*   (2006.01)
*H02M 1/00*    (2006.01)

(52) U.S. Cl.
CPC .............. *H02M 3/24* (2013.01); *H01F 27/24* (2013.01); *H02M 1/00* (2013.01)

(58) Field of Classification Search
CPC ...... H02M 3/33546; H02M 3/24; H02M 1/00; H01F 27/24
See application file for complete search history.

(56) References Cited

U.S. PATENT DOCUMENTS

| | | |
|---|---|---|
| 2006/0279966 A1 | 12/2006 | Fan et al. |
| 2014/0241012 A1* | 8/2014 | Lindberg-Poulsen ...................... H02M 3/33523 363/17 |
| 2017/0294843 A1* | 10/2017 | Norisada ................. H02M 1/08 |
| 2018/0109174 A1* | 4/2018 | Angkititrakul ..... H02M 3/1588 |

FOREIGN PATENT DOCUMENTS

| | | |
|---|---|---|
| CN | 101355308 | 1/2009 |
| CN | 101697453 | 4/2010 |
| CN | 107294414 | 10/2017 |
| KR | 1998-040074 | 8/1998 |
| KR | 20170088610 | 8/2017 |

* cited by examiner

*Primary Examiner* — Alex Torres-Rivera
*Assistant Examiner* — Trinh Q Dang
(74) *Attorney, Agent, or Firm* — H.C. Park & Associates, PLC (57) ABSTRACT

A low-voltage DC-DC converter includes a switch configured to convert a high voltage supplied from a high-voltage battery to an alternating current (AC) voltage, a transformer including an air gap in a core region and configured to lower the AC voltage to a low voltage using an adjusted turns ratio, and a power supply configured to rectify the low voltage and supply the rectified low voltage to a load.

4 Claims, 9 Drawing Sheets

| ITEM | BEFORE CHANGE | AFTER CHANGE |
|---|---|---|
| CORE AIR GAP YES/NO | X | O |
| TRANSFORMER TURNS RATIO | 10:1:1 | 11:1:1 |
| INPUT VOLTAGE | 200V | 200V |
| INPUT CURRENT | 12.05 | 11.56A |
| TRANSFORMER MAGNETIZING INDUCTANCE | 800uH | 200uH |
| TRANSFORMER LEAKAGE INDUCTANCE | 2.8uH | 4.3uH |
| ZVS INDUCTOR | 3.6uH | X |
| OUTPUT VOLTAGE | 13.85V | 13.9V |
| OUTPUT CURRENT | 129A | 130A |
| TRANSFORMER DUTY RATIO | 96.1 | 94.4 |

LOW-VOLTAGE DC-DC CONVERTER INCLUDING ZERO VOLTAGE SWITCHING AND METHOD OF DRIVING SAME

CROSS-REFERENCE TO RELATED APPLICATION

This application claims priority from and the benefit of Korean Patent Application No. 2018-0083575, filed on Jul. 18, 2018, which is hereby incorporated by reference for all purposes as if set forth herein.

BACKGROUND

Field

Exemplary embodiments relate to a low-voltage DC-DC converter and a method of driving the same.

Discussion of the Background

Low-voltage direct current (DC)-DC converters (LDCs) are electric power supplies which are necessarily required to take charge of supplying electric power to electric loads and charging low-voltage auxiliary batteries installed in eco-friendly vehicles.

Such low-voltage DC-DC converters are classified into various kinds according to driving methods, and high power is converted in a full-bridge manner to perform an isolated switching operation.

However, switching power loss occurs in a conventional LDC during a control switching operation of a power switching element.

Meanwhile, in order to solve this problem, Korean Unexamined Patent Publication No. 1998-040074 (Title: A ZERO VOLTAGE SWITCHING DC-DC STEP DOWN CONVERTER) discloses a zero voltage switching technology of a power switching element.

That is, the related art uses a zero voltage switching operation to reduce switching power loss.

However, in the related art, a zero voltage switching inductor should be additionally installed so as to secure the zero voltage switching operation.

However, since the zero voltage switching inductor generates heat during a high speed switching operation of the power switching element, a heat dissipation structure using a heat sink plate is needed and a large space is needed from a viewpoint of a system.

The above information disclosed in this Background section is only for enhancement of understanding of the background of the invention and, therefore, it may contain information that does not constitute prior art.

SUMMARY

Exemplary embodiments of the present invention is directed to providing a low-voltage DC-DC converter capable of reducing a size and costs of a product and increasing a power density by adding an air gap in a core region of a transformer and adjusting a turns ratio of the transformer, and a method of driving the same.

However, technical target objectives of the present embodiments are not limited to the above-described technical objectives, and other technical objectives may be present.

According to an aspect of the present invention, there is provided a low-voltage DC-DC converter including a switch configured to convert a high voltage supplied from a high-voltage battery to an alternating current (AC) voltage, a transformer including an air gap in a core region and configured to lower the AC voltage to a low voltage using an adjusted turns ratio, and a power supply configured to rectify the low voltage and supply the rectified low voltage to a load.

Power switching elements may be disposed in the switch in a full-bridge manner.

The turns ratio may be set on the basis of a primary input current, a secondary input current, and a magnetizing current of the transformer.

The air gap in the core region and the turns ratio may be adjusted by comparing a minimum inductance value of power switching elements for a zero voltage switching operation and a leakage inductance value of the transformer.

The minimum inductance value may be set on the basis of a parasitic capacitance of power switching elements and energy stored in a zero voltage switching inductor.

The leakage inductance value may be calculated on the basis of a primary leakage inductance value, the number of primary turns, and a primary circuit resistance of the transformer.

In addition, according to another aspect of the present invention, there is provided a method of driving a low-voltage DC-DC converter, the method including converting a high voltage supplied from a high-voltage battery to an AC voltage, lowering the AC voltage to a low voltage using a transformer in which an air gap is included in a core region and a turns ratio is adjusted, and rectifying the low voltage and supplying the rectified low voltage to a load.

The high voltage may be converted to the AC voltage through power switching elements disposed in a full-bridge manner.

The turns ratio may be set on the basis of a primary input current, a secondary input current, and a magnetizing current of the transformer.

The air gap in the core region and the turns ratio may be adjusted by comparing a minimum inductance value of power switching elements for a zero voltage switching operation and a leakage inductance value of the transformer.

The minimum inductance value may be set on the basis of a parasitic capacitance of the power switching elements and energy stored in a zero voltage switching inductor.

The leakage inductance value may be calculated on the basis of a primary leakage inductance value, the number of primary turns, and a primary circuit resistance of the transformer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereinafter, embodiments that are easily performed by those skilled in the art will be described in detail with reference to the accompanying drawings. However, the embodiments of the present invention may be implemented in several different forms and are not limited to the embodiments described herein. In addition, parts irrelevant to the description are omitted in the drawings in order to clearly explain the embodiments of the present invention.

Meanwhile, the terms used herein are provided only to describe the embodiments of the present invention and not for purposes of limitation. Unless the context clearly indicates otherwise, the singular forms include the plural forms. It will be understood that the terms "comprise" and "comprising," when used herein, specify some stated components, steps, operations and/or elements, but do not preclude the presence or addition of one or more other components, steps, operations and/or elements.

The present invention relates to a low-voltage direct current (DC)-DC converter 100 and a method of driving the same.

In an eco-friendly vehicle, a low-voltage DC-DC converter is a necessary device for charging a low-voltage auxiliary battery with a high voltage output from a high voltage main battery and supplying power to various electric loads installed in the vehicle. In addition, high power conversion uses a full-bridge manner to perform an isolated switching operation.

Hereinafter, an operation of a conventional low-voltage DC-DC converter will be described with reference to FIG. 1.

Figure 1:
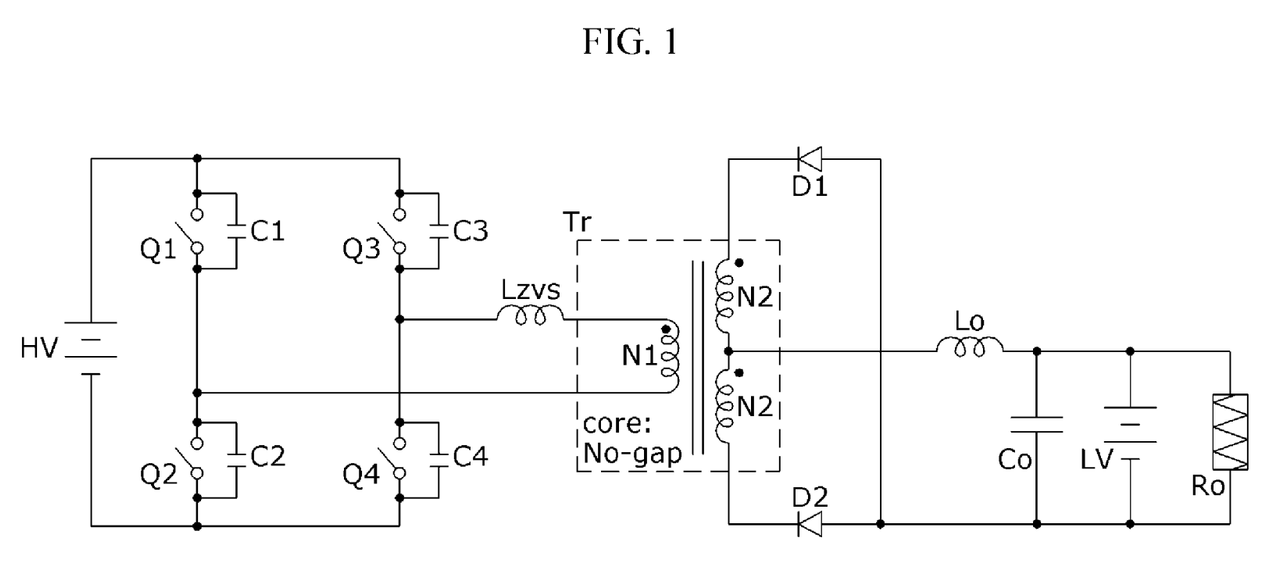
FIG. 1 is a view illustrating a low-voltage direct current (DC)-DC converter operated in a full-bridge manner according to the related art.

FIG. 1 is a view illustrating a low-voltage DC-DC converter operated in a full-bridge manner according to the related art.

FIG. 1 is a view illustrating a low-voltage DC-DC converter operated in a full-bridge manner according to the related art.

In this case, since power loss occurs during the operation of the power switching elements Q1, Q2, Q3, and Q4, a zero voltage switching operation is used to minimize the switching power loss.

The zero voltage switching operation is a high speed switching technique of a power element and an important factor contributing to achievement of high efficiency in the converter field, but requires a zero voltage switching inductor Lzvs.

However, since the zero voltage switching inductor Lzvs generates heat during the switching operation of the power switching elements Q1, Q2, Q3, and Q4, a heat dissipation structure using a heat sink or a cooling system therefor is needed, and thus a large space is needed from a viewpoint of a system and a size of a product is increased.

In one embodiment of the present invention, an air gap is added in a core region of a transformer 120 and a turns ratio of the transformer 120 is adjusted to substitute for the conventional zero voltage switching inductor.

Hereinafter, a low-voltage DC-DC converter 100 according to one embodiment of the present invention will be described with reference to FIGS. 2 to 4.

Figure 2:
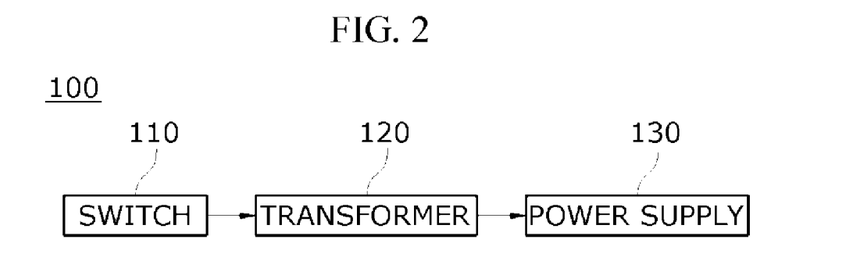
FIG. 2 is a configuration diagram illustrating a low-voltage DC-DC converter according to one embodiment of the present invention.
Figure 3:
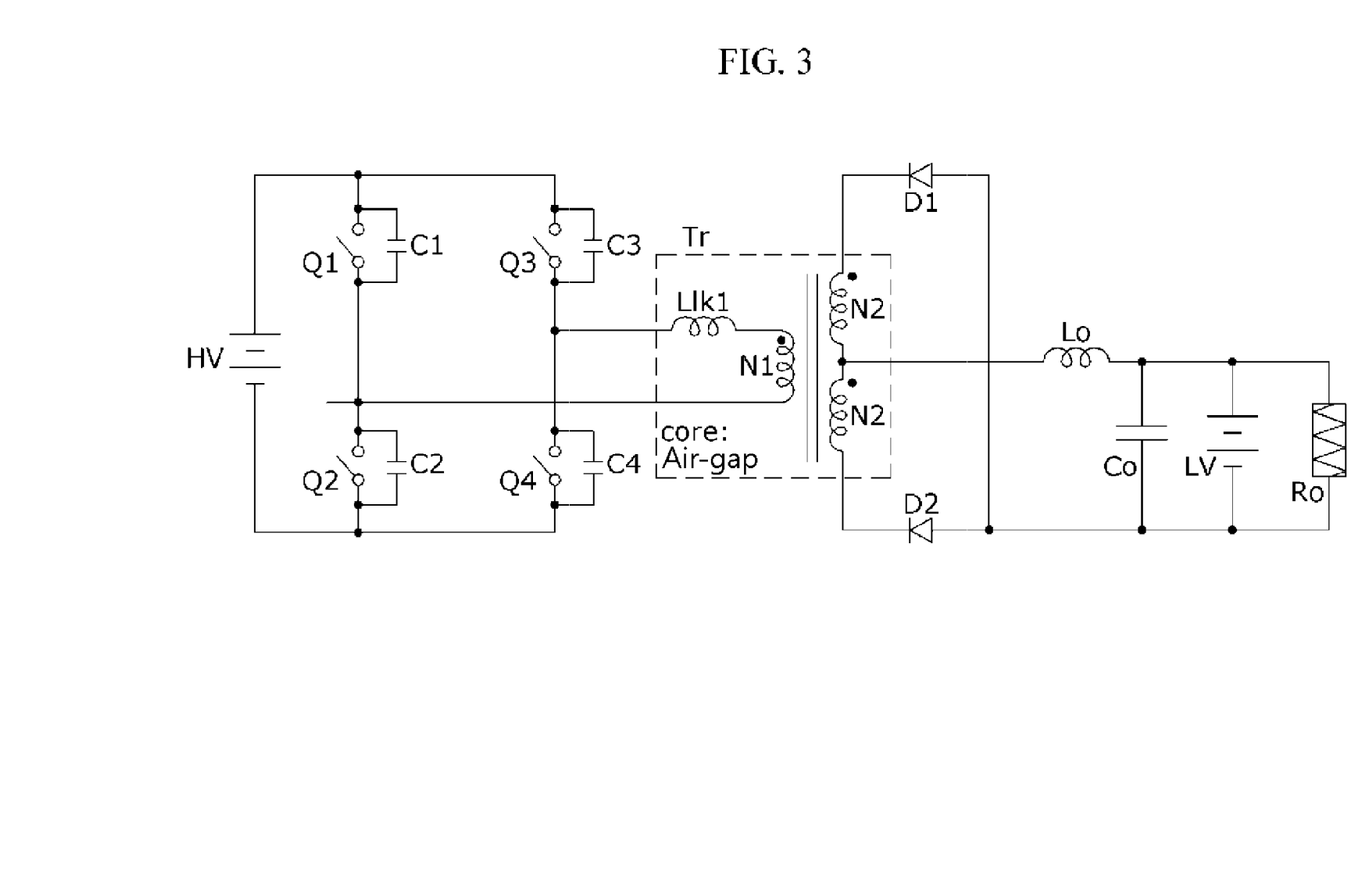
FIG. 3 is a view for describing the low-voltage DC-DC converter according to one embodiment of the present invention.
Figure 4:
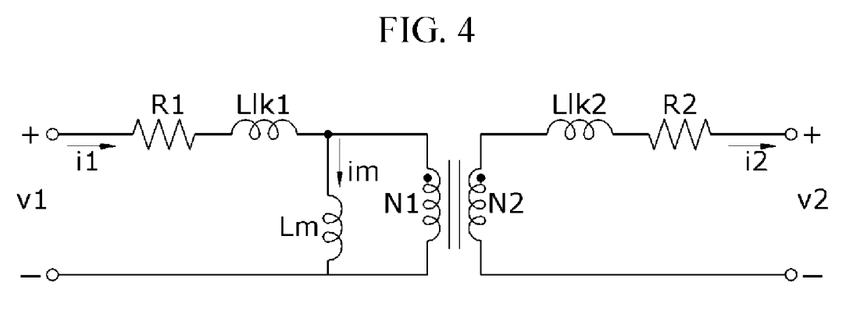
FIG. 4 is a view illustrating a transformer of the low-voltage DC-DC converter according to one embodiment of the present invention.

FIG. 2 is a configuration diagram illustrating a low-voltage DC-DC converter 100 according to one embodiment of the present invention, FIG. 3 is a view for describing the low-voltage DC-DC converter 100 according to one embodiment of the present invention, and FIG. 4 is a view illustrating a transformer 120 of the low-voltage DC-DC converter 100 according to one embodiment of the present invention.

As illustrated in FIG. 2, the low-voltage DC-DC converter 100 according to one embodiment of the present invention includes a switch 110, the transformer 120, and a power supply 130.

The switch 110 converts a high voltage supplied from a high-voltage battery of a vehicle to an AC voltage.

Referring to FIG. 3, power switching elements Q1, Q2, Q3, and Q4 are disposed in the switch 110 in a full-bridge manner and may perform a zero voltage switching operation using a leakage inductance Llk1 which will be described below.

In addition, an inductor Lzvs, which is installed for a zero voltage switching operation according to the related art, is removed from the switch 110, an air gap is added in a core region of the above-described transformer 120, and a turns ratio thereof is adjusted to substitute for a primary leakage inductance Llk1 of the transformer 120, thereby reducing material costs and a size of a product. In addition, since the size of the product is reduced, a power density of the product can be increased.

The transformer 120 lowers an AC voltage output from the switch 110 to a low voltage and transmits the lowered voltage to the power supply 130.

Referring to FIG. 4, since the air gap is added in the core region of the transformer 120, a magnetizing inductance Lm is decreased according to Equation 1.

$$Lm = \frac{N1^2}{Rc + Rg} \qquad \text{[Equation 1]}$$

Here, Lm is a magnetizing inductance of the transformer 120, N1 is the number of primary turns of the transformer 120, Rc is a magnetic resistance of the core region, and Rg is a magnetic resistance of the air gap.

Since a core of the transformer 120 according to one embodiment of the present invention is formed of a magnetic material and may not perform a normal function when a current, which exceeds a saturation property inherent to the magnetic material, is applied thereto, a turns ratio of the transformer 120 is considered to decrease a magnetizing current.

Accordingly, by adjusting the turns ratio of the transformer 120, effects can be achieved in that a magnetizing current im of the transformer 120 is decreased according to Equation 2 and a primary leakage inductance Llkl of the transformer 120 is increased according to Equation 3.

$$im = i1 - \frac{N2}{N1}i2 \qquad \text{[Equation 2]}$$

Here, im is a magnetizing current of the transformer 120, i1 is a primary input current of the transformer 120 1, N1 is the number of primary turns of the transformer 120, N2 is the number of secondary turns of the transformer 120, and i2 is a secondary output current of the transformer 120.

$$Llk1 = \frac{N1^2}{R1} \qquad \text{[Equation 3]}$$

Here, Llkl is a primary leakage inductance value of the transformer 120, N1 is the number of primary turns of the transformer 120, and R1 is a primary circuit resistance of the transformer 120.

The power supply 130 rectifies a low voltage output from the transformer 120 and supplies the rectified low voltage to a load.

Hereinafter, a method of driving the low-voltage DC-DC converter 100 will be described with reference to FIG. 5.

Figure 5:
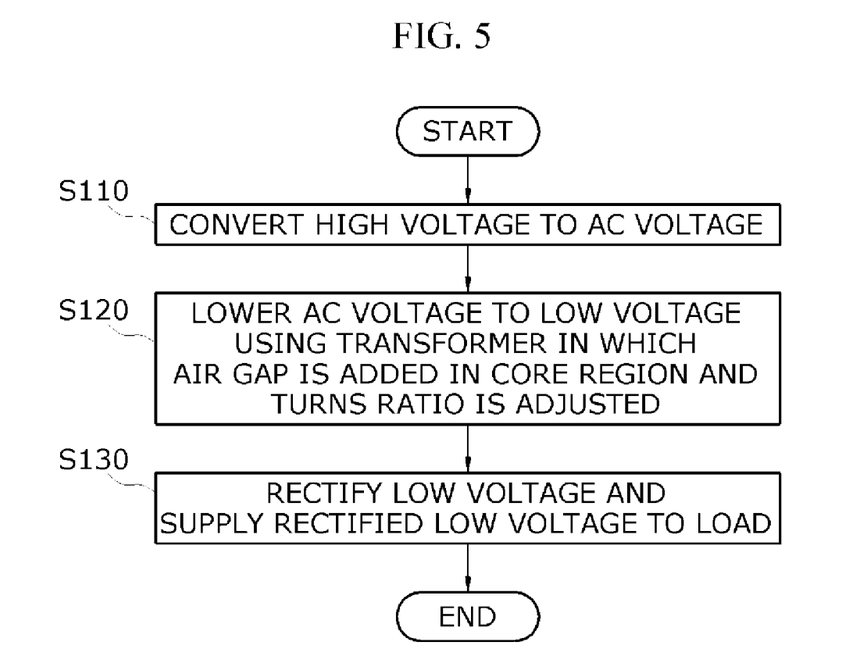
FIG. 5 is a flowchart of a method of driving the low-voltage DC-DC converter according to one embodiment of the present invention.

FIG. 5 is a flowchart of a method of driving the low-voltage DC-DC converter 100 according to one embodiment of the present invention.

Referring to FIG. 5, first, in the method of driving the low-voltage DC-DC converter 100, a high voltage supplied from the high-voltage battery of the vehicle is converted to an AC voltage (S110).

At this moment, according to one embodiment of the present invention, the power switching elements may be disposed in the full-bridge manner to convert the high voltage of the vehicle to the AC voltage.

Then, the AC voltage is lowered to a low voltage using the transformer 120 in which the air gap is added in the core region and a turns ratio is adjusted.

At this moment, since the specific description in which the air gap is added in the core region of the transformer 120 and the turns ratio is adjusted has been described with reference to FIG. 4 and Equations 1 to 3 which are described above, the specific description will be omitted below.

Finally, the low voltage is rectified and supplied to a low-voltage auxiliary battery and an electric load of the vehicle (S130).

In the above description, the operations of S110 to S130 may be further divided into additional operations or combined into a decreased number of operations. In addition, some operations may be omitted as necessary, or the order of the operations may also be changed. In addition, even other omitted operations, which are already described with reference to FIG. 4, may also be applied to the method of driving the low-voltage DC-DC converter 100 of FIG. 5.

Figure 6:
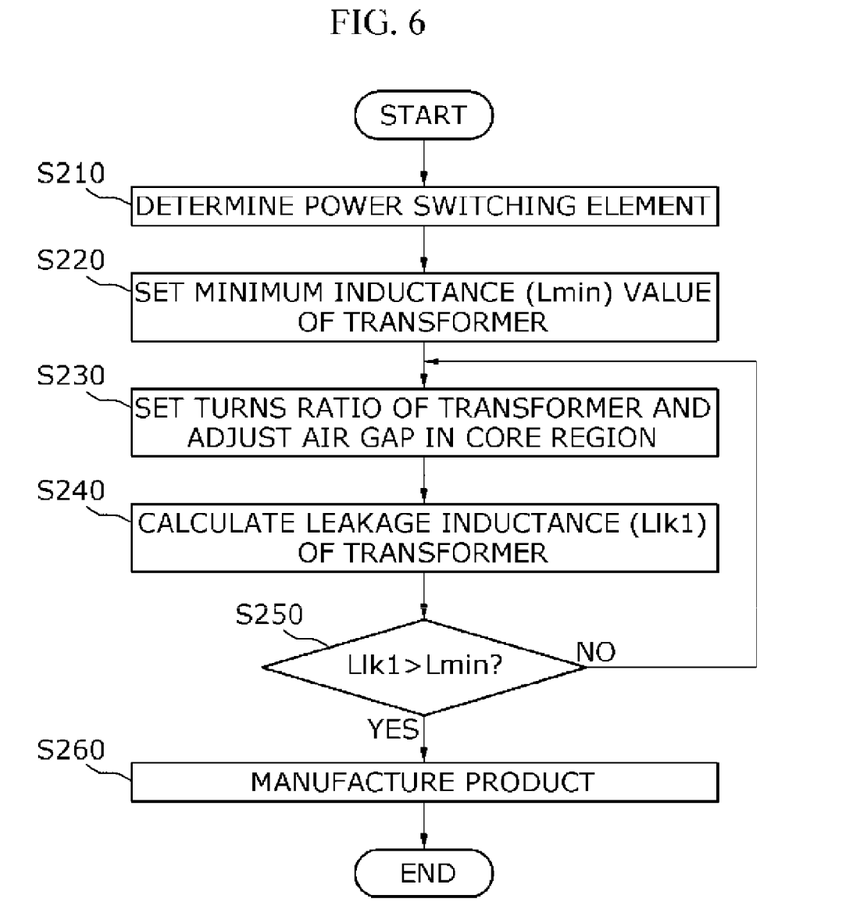
FIG. 6 is a flowchart of a method of setting the transformer of the low-voltage DC-DC converter according to one embodiment of the present invention.

Meanwhile, the transformer 120 of the low-voltage DC-DC converter 100 according to one embodiment of the present invention may be set through a method of FIG. 6.

FIG. 6 is a flowchart of a method of setting the transformer 120 of the low-voltage DC-DC converter 100 according to one embodiment of the present invention.

Referring to FIG. 6, first, a power switching element is set by considering a voltage/current capacity and a parasitic capacitance (S210).

Then, a value of a minimum inductance Lmin is set to secure a zero voltage switching operation (S220).

Here, the minimum inductance value is a minimum value through which the transformer 120 secures the zero voltage switching operation of the power switching element and is set such that the parasitic capacitance of the power switching element is less than energy stored in the transformer 120.

Then, a turns ratio of the transformer 120 is set and an air gap is adjusted according to one embodiment of the present invention (S230).

At this moment, an input voltage range is considered to set the turns ratio of the transformer 120 and adjust the air gap of the core region.

Then, a value of the leakage inductance Llk1 of the transformer 120 is calculated using above-described Equation 3 (S240).

Then, the set value of the minimum inductance Lmin and the value of the calculated leakage inductance Llk1 are compared (S250).

In a case in which the value of the minimum inductance Lmin is less than the value of the leakage inductance Llk1 in the comparison result, the transformer 120 formed under conditions of the decreased magnetizing current and magnetizing inductance and the increased value of the leakage inductance is applied to the product (S260).

Conversely, in a case in which the value of the minimum inductance Lmin is greater than the value of the leakage inductance Llk1, an operation S230 in which the turns ratio is set and the air gap is adjusted is performed again.

Hereinafter, an internal structure of a transformer 120 according to the related art, an internal structure of the transformer 120 according to one embodiment of the present invention, and changes in output values according to addition of the air gap in the core region of the transformer 120 and the adjustment of the turns ratio will be described with reference to FIGS. 7 to 9.

Figure 7:
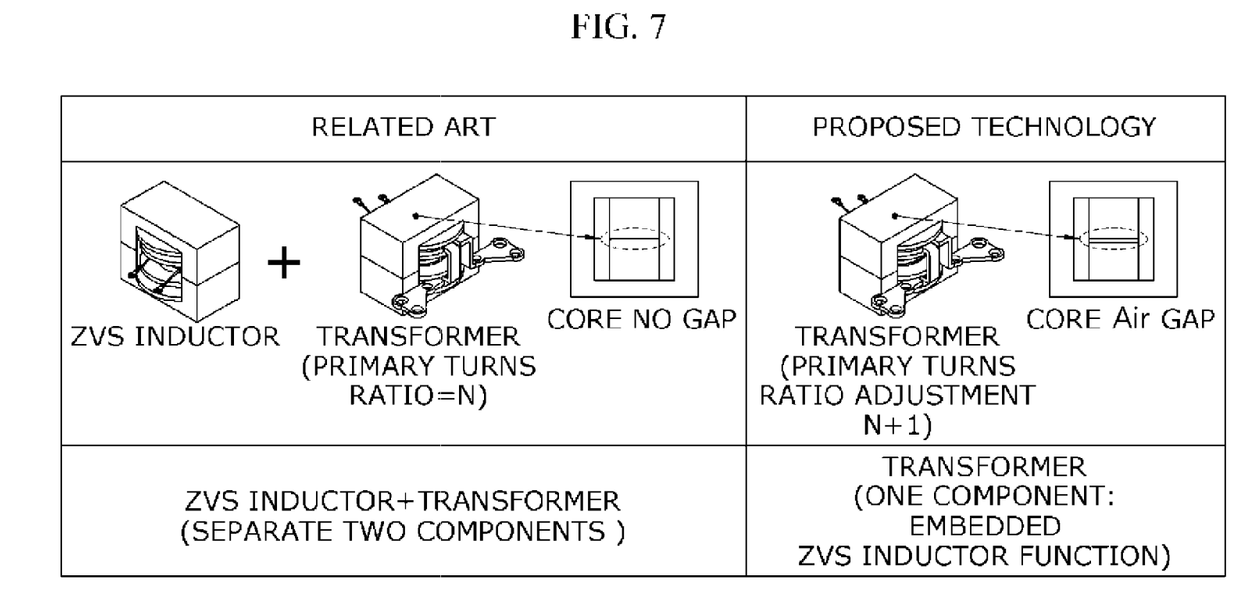
FIG. 7 is a view illustrating an internal structure of a transformer of a low-voltage DC-DC converter according to each of the related art and one embodiment of the present invention.

FIG. 7 is a view illustrating the internal structure of the transformer 120 of the low-voltage DC-DC converter 100 according to each of the related art and one embodiment of the present invention.

Referring to FIG. 7, in one embodiment of the present invention, a zero voltage switching inductor, which is additionally installed in the transformer 120 according to the related art, is removed from the transformer 120, the air gap is added in the core region of the transformer 120, and the turns ratio of the transformer 120 is adjusted to substitute for the zero voltage switching inductor. Accordingly, the number of components can be decreased in comparison with the conventional transformer, thereby reducing material costs and a size of the product. In addition, since the size of the product is decreased, a power density of the product can be increased.

Figure 8A:
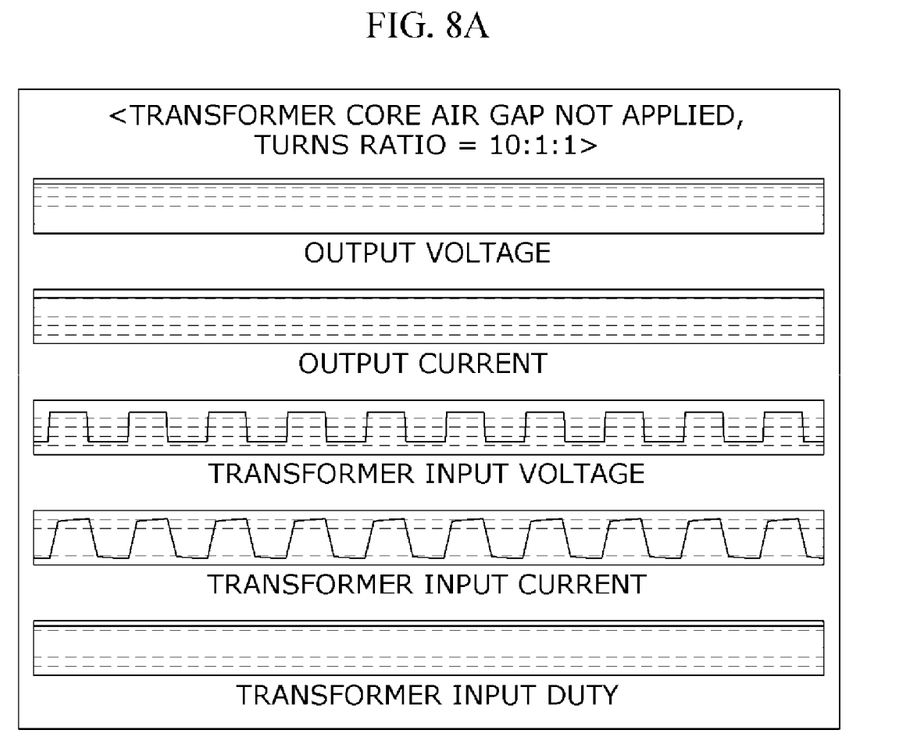
FIG. 8A is a view showing output waveforms of the low-voltage DC-DC converter according to each of the related art.
Figure 8B:
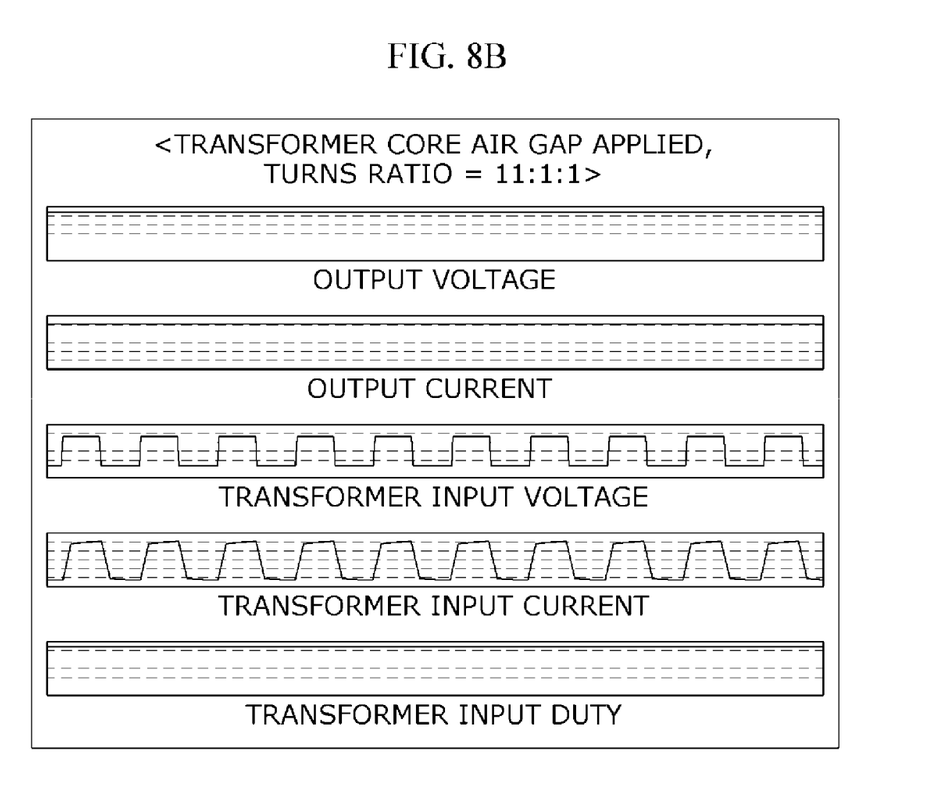
FIG. 8B is a view showing output waveforms of the low-voltage DC-DC converter according to one embodiment of the present invention.

FIG. 8A is a view showing output waveforms of the low-voltage DC-DC converter according to each of the related art and FIG. 8B is a view showing output waveforms of the low-voltage DC-DC converter 100 according to one embodiment of the present invention, and the result which can be easily compared among a plurality of performing results is shown. FIG. 9 is a table showing output values of the low-voltage DC-DC converter 100 according to each of the related art and one embodiment of the present invention.

FIG. 8A shows waveforms formed using output values according to the related art and FIG. 8B shows waveforms formed using output values after the air gap is added in the core region of the transformer 120 and the turns ratio is adjusted.

According to one embodiment of the present invention, the turns ratio may be adjusted to be 11:1:1.

Figure 9:
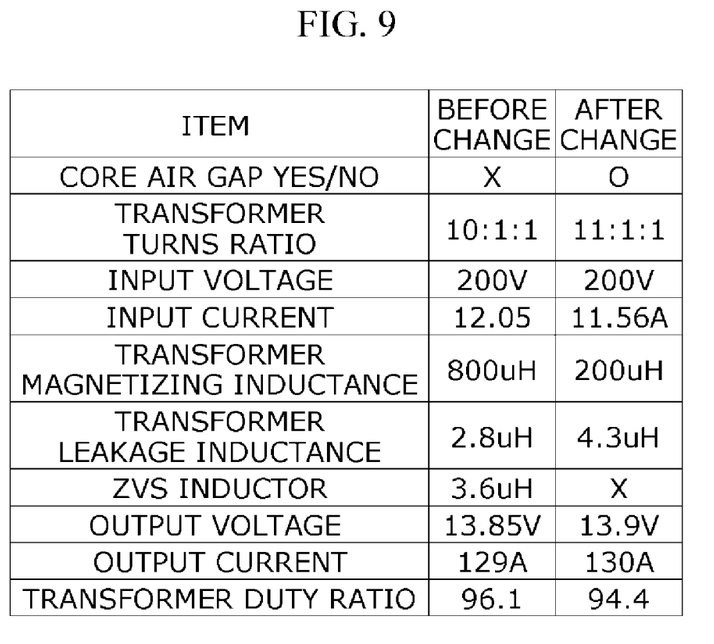
FIG. 9 is a table showing output values of the low-voltage DC-DC converter according to each of the related art and one embodiment of the present invention.

Referring to FIG. 9, the input voltage and the input current according to one embodiment of the present invention is the same as those according to the related art. A magnetizing inductance of 800 µH according to the related art is decreased to 210 µH after the air gap is added in the core region of the transformer 120 and the turns ratio is adjusted according to one embodiment of the present invention. In addition, the leakage inductance of the transformer 120 is increased from 2.8 µH to 4.3 µH.

In the simulation result, it can be seen that, as the magnetizing inductance is decreased, the magnetizing current is decreased, and operation performance of the low-voltage DC-DC converter 100 is higher than or equal to that of a conventional low-voltage DC-DC converter, and since the magnetizing current is decreased, the input current is decreased in comparison with the conventional low-voltage DC-DC converter so that an effect of an increase in system efficiency can be expected. In addition, it was seen that a margin for a duty ratio of the transformer 120 was also able to be secured.

According to one embodiment of the present invention, costs and a size of a product can be significantly reduced by adding an air gap in a core region of a transformer and adjusting a turns ratio.

A power density of the low-voltage DC-DC converter can also be increased according to the size reduction of the product.

The above description is only exemplary, and it will be understood by those skilled in the art that the invention may be performed in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined by the appended claims, and encompasses all modifications or alterations derived from meanings, the scope and equivalents of the appended claims.

What is claimed is:

1. A low-voltage DC-DC converter comprising:
a switch configured to convert a high voltage supplied from a high-voltage battery to an alternating current (AC) voltage;
a transformer including an air gap in a core region and configured to lower the AC voltage to a low voltage using an adjusted turns ratio; and
a power supply configured to rectify the low voltage and supply the rectified low voltage to a load,
wherein:
the turns ratio is set on the basis of a primary input current, a secondary output current, and a magnetizing current of the transformer;
the air gap in the core region and the turns ratio are adjusted to provide a leakage inductance of the transformer that secures a zero voltage switching operation; and
the leakage inductance value is calculated on the basis of the number of primary turns and a primary circuit resistance of the transformer.

2. The low-voltage DC-DC converter of claim 1, wherein power switching elements are disposed in the switch in a full-bridge manner.

3. A method of driving a low-voltage DC-DC converter, the method comprising:
converting a high voltage supplied from a high-voltage battery to an alternating current (AC) voltage;
lowering the AC voltage to a low voltage using a transformer in which an air gap is included in a core region and a turns ratio is adjusted; and
rectifying the low voltage and supplying the rectified low voltage to a load,
wherein:
the turns ratio is set on the basis of a primary input current, a secondary output current, and a magnetizing current of the transformer;
the air gap and the turns ratio of the transformer are adjusted by comparing a minimum inductance value of the transformer to secure a zero voltage switching operation and a leakage inductance value of the transformer so that the leakage inductance value of the transformer is greater than the minimum inductance value of the transformer;
the minimum inductance value is set on the basis of a parasitic capacitance of the power switching elements and energy stored in the transformer; and
the leakage inductance value is calculated on the basis of the number of primary turns and a primary circuit resistance of the transformer.

4. The method of claim 3, wherein the high voltage is converted to the AC voltage through power switching elements disposed in a full-bridge manner.

* * * * *